(12) United States Patent
Derbanne et al.

(10) Patent No.: US 11,475,594 B1
(45) Date of Patent: Oct. 18, 2022

(54) SYSTEMS AND METHODS FOR DYNAMIC OPTICAL ELEMENT DETECTION

(71) Applicant: GoPro, Inc., San Mateo, CA (US)

(72) Inventors: Thomas Derbanne, Paris (FR); Guillaume Matthieu Guérin, Chatillon (FR); Adrien Cariou, Paris (FR)

(73) Assignee: GoPro, Inc., San Mateo, CA (US)

( * ) Notice: Subject to any disclaimer, the term of this patent is extended or adjusted under 35 U.S.C. 154(b) by 511 days.

(21) Appl. No.: 16/702,309

(22) Filed: Dec. 3, 2019

(51) Int. Cl.
*G06T 7/80* (2017.01)
*H04N 5/235* (2006.01)
*G03B 17/14* (2021.01)
*H04N 5/238* (2006.01)
*H04N 5/225* (2006.01)

(52) U.S. Cl.
CPC ............... *G06T 7/80* (2017.01); *G03B 17/14* (2013.01); *H04N 5/2254* (2013.01); *H04N 5/238* (2013.01); *H04N 5/2351* (2013.01)

(58) Field of Classification Search
CPC .. G06T 7/80; G06T 5/005; G06T 5/00; G06T 2207/10024; G03B 17/14; H04N 5/2254; H04N 5/2351; H04N 5/238; H04N 1/58
See application file for complete search history.

(56) References Cited

U.S. PATENT DOCUMENTS

2015/0071535 A1* 3/2015 Wang ................ H04N 1/58
382/167

* cited by examiner

*Primary Examiner* — Antoinette T Spinks
(74) *Attorney, Agent, or Firm* — Esplin & Associates, PC

(57) ABSTRACT

Optical element(s) of an image capture device may be changed. Characteristic(s) of the optical element(s) may be determined based on shading map corresponding to an image captured by the image capture device and the lighting condition during the capture of the image. The image capture device may be operated in accordance with the determined characteristic(s) of the optical element(s).

20 Claims, 5 Drawing Sheets

400

| Lighting Condition | Shading Map |
|---|---|
| Lighting Condition A | Shading Map A |
| Lighting Condition B | Shading Map B |
| Lighting Condition C | Shading Map C |
| Lighting Condition D | Shading Map D |
| Lighting Condition E | Shading Map E |
| Lighting Condition F | Shading Map F |
| Lighting Condition G | Shading Map G |
| Lighting Condition H | Shading Map H |

| Lighting Condition | Shading Map | Optical Element |
|---|---|---|
| A | A | A |
| A | B | B |
| B | A | C |
| B | B | D |

FIG. 5

SYSTEMS AND METHODS FOR DYNAMIC OPTICAL ELEMENT DETECTION

FIELD

This disclosure relates to dynamically determining optical element characteristics of an image capture device.

BACKGROUND

Certain features of an image capture device, such as electronic image stabilization, leveling, stitching, and/or image analysis, require precise calibration of the optical characteristics (e.g., optical element characteristics) of the image capture device. Improper calibration (e.g., due to change in characteristics of the optical element, change in optical element used) may cause such features of the image capture device to perform poorly. For example, improper calibration of optical characteristics may result in distorted stabilization, missing correspondence between lenses in stitching, and/or insufficient/excessive image corrections (e.g., chromatic aberration correction, vignetting correction).

SUMMARY

This disclosure relates to dynamic optical element detection. Shading map information, lighting condition information, and/or other information may be obtained. The shading map information may characterize a shading map corresponding to an image captured through an optical element set of an image capture device. The lighting condition information may characterize a lighting condition during the capture of the image by the image capture device through the optical element set. One or more characteristics of the optical element set may be determined based on the shading map, the lighting condition, and/or other information. Operation of the image capture device may be effectuated based on the characteristic(s) of the optical element set and/or other information.

A system that performs dynamic optical element detection may include one or more electronic storages, one or more processors, and/or other components. An electronic storage may store shading map information, information relating to shading map, lighting condition information, information relating to lighting condition, information relating to characteristic of an optical element set, information relating to operation of the image capture device, and/or other information. In some implementations, the system may include one or more optical elements, one or more image sensors, and/or other components.

One or more components of the system may be carried by a housing, such as a housing of an image capture device. For example, the optical element(s), and/or the image sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate dynamic optical element detection. The machine-readable instructions may include one or more computer program components. The computer program components may include one or more of a shading map information component, a lighting condition information component, a characteristic component, an operation component, and/or other computer program components.

The shading map information component may be configured to obtain shading map information and/or other information. The shading map information may characterize one or more shading maps corresponding to one or more images captured through an optical element set of an image capture device. In some implementations, a shading map may correct vignetting within an image caused by the optical element set.

In some implementations, the optical element set may include one or more optical elements of the image capture device and one or more optical element extensions installed on the image capture device. In some implementations, the optical element set may include one or more interchangeable optical elements installed on the image capture device.

The lighting condition information component may be configured to obtain lighting condition information and/or other information. The lighting condition information may characterize one or more lighting conditions during the capture of the image(s) by the image capture device through the optical element set. In some implementations, a lighting condition may include hue of light emitted by one or more lighting sources. In some implementations, a lighting condition may include type of one or more lighting sources.

The characteristic component may be configured to determine one or more characteristics of the optical element set based on the shading map(s), the lighting condition(s), and/or other information. In some implementations, determination of the characteristic(s) of the optical element set may include identification of the optical element extension(s) installed on the image capture device.

In some implementations, determination of the characteristic(s) of the optical element set may include determination of one or more calibration parameters for the optical element set. In some implementations, determination of the characteristic(s) of the optical element set based on the shading map(s) and the lighting condition(s) may include identification of the characteristic(s) of the optical element set based on classification using the shading map(s), the lighting condition(s), and/or other information.

The operation component may be configured to effectuate operation of the image capture device based on the characteristic(s) of the optical element set and/or other information. In some implementations, effectuation of the operation of the image capture device based on the characteristic(s) of the optical element set may include a change in operating calibration parameters of the image capture device for the optical element set based on the determined calibration parameter(s) for the optical element set.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 4 illustrates example lighting conditions and shading maps for an optical element.

FIG. 5 illustrates example optical element detection based on lighting condition and shading map.

DETAILED DESCRIPTION

Figure 1:
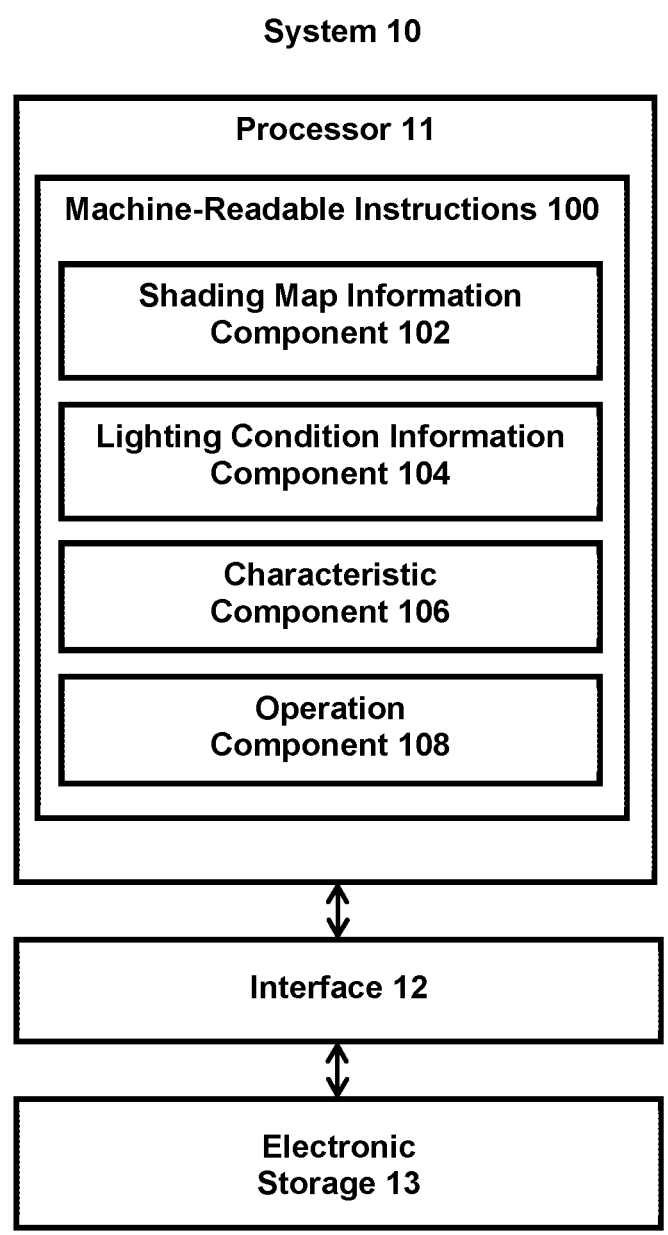
FIG. 1 illustrates an example system that performs dynamic optical element detection.

FIG. 1 illustrates a system 10 for dynamic optical element detection. The system 10 may include one or more of a processor 11, an interface 12 (e.g., bus, wireless interface), an electronic storage 13, and/or other components. In some implementations, the system 10 may include one or more optical elements, one or more image sensors, and/or other components. Shading map information, lighting condition information, and/or other information may be obtained by the processor 11. The shading map information may characterize a shading map corresponding to an image captured through an optical element set of an image capture device. The lighting condition information may characterize a lighting condition during the capture of the image by the image capture device through the optical element set. One or more characteristics of the optical element set may be determined by the processor 11 based on the shading map, the lighting condition, and/or other information. Operation of the image capture device may be effectuated by the processor 11 based on the characteristic(s) of the optical element set and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store shading map information, information relating to shading map, lighting condition information, information relating to lighting condition, information relating to characteristic of an optical element set, information relating to operation of the image capture device, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamic optical element detection. The machine-readable instructions 100 may include one or more computer program components. The machine-readable instructions 100 may include one or more of shading map information component 102, a lighting condition information component 104, a characteristic component 106, an operation component 108, and/or other computer program components.

The system 10 may be remote from an image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s) and/or image sensor(s) of the system 10 may be carried by the housing of the image capture device. The housing may carry other components, such as the processor 11 and/or the electronic storage 13.

Figure 3:
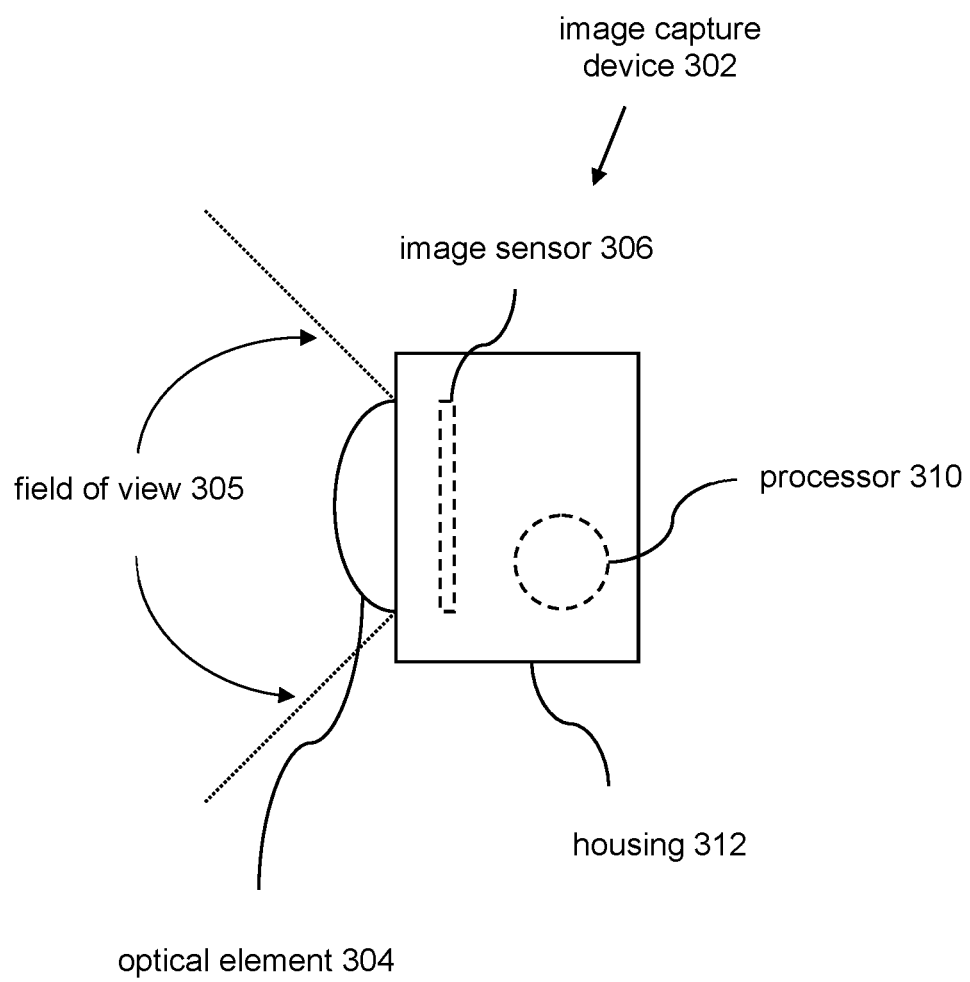
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) an optical element 304, an image sensor 306, a processor 310, and/or other components.

One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

In some implementations, the optical element 304 may form and/or be part of an optical element set of the image capture device 302. An optical element set may include one or more optical elements. Optical element(s) of an optical element set(s) may guide light within a field of view to an image sensor. For example, the optical element set of an image capture device may include one or more optical elements of the image capture device (e.g., the optical element 304), one or more optical element extensions installed on the image capture device, and/or other optical elements. An optical element extension may refer to an optical element part that is added to the image capture device to change one or more optical characteristics of the image capture device. For instance, one or more optical element extensions may be installed on the image capture device 302 to change the optical characteristics of the image capture device 302 (e.g., change field of view, change light distortion). Installing an optical element extension on the image capture device may include installing the optical element extension on the housing of the image capture device, installing the optical element extension on the optical element of the image capture device, and/or otherwise installing the optical element extension on the image capture device. For instance, one or more optical element extensions may be installed over or on-top of the optical element 304. An optical element extension may be installed on the image capture device via one or more of mechanical coupling, magnetic coupling, electric coupling, and/or other coupling.

As another example, the optical element set of an image capture device may include one or more interchangeable optical elements installed on the image capture device. An interchangeable optical element may refer to an optical element that may be exchanged with one or more other optical elements of the image capture device. Interchangeable optical element(s) may be installed on an image capture device to change the optical characteristics of the image capture device (e.g., change field of view, change light distortion). For example, an interchangeable optical element may include a lens (swappable lens) that can be switched with a lens of the image capture device. For instance, the optical element 304 may be an interchangeable optical element that is configured to be installed on and uninstalled from the housing 312.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

Referring back to FIG. 1, the processor 11 (or one or more components of the processor 11) may be configured to obtain information to facilitate dynamic optical element detection. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The shading map information component 102 may be configured to obtain shading map information and/or other information. Obtaining shading map information may include one or more of accessing, acquiring, analyzing, determining, examining, identifying, loading, locating, opening, receiving, retrieving, reviewing, selecting, storing, and/or otherwise obtaining the shading map information. The shading map information component 102 may obtain shading map information from one or more locations. For example, the shading map information component 102 may obtain shading map information from a storage location, such as the electronic storage 13, electronic storage of information and/or signals generated by one or more sensors, electronic storage of a device accessible via a network, and/or other locations. The shading map information component 102 may obtain shading map information from one or more hardware components (e.g., a hardware component of an image capture device) and/or one or more software components (e.g., software running on a computing device/image capture device).

The shading map information may characterize one or more shading maps. The shading map information may characterize a shading map by including information that describes, identifies, is associated with, and/or otherwise characterizes one or more of content, quality, attribute, feature, and/or other aspects of the shading map. For example, the shading map information may characterize a shading map by including information that makes up the content of the shading map (e.g., information defining the shading map) and/or information that is used to identify the shading map. Other types of shading map information are contemplated.

A shading map may correspond to one or more images captured through an optical element set of an image capture device. A shading map corresponding to an image may include the shading map being used to process the image. An optical element set may include one or more optical elements. An optical element set of an image capture device may include one or more optical elements of the image capture device, one or more optical element extensions installed on the image capture device, and/or other optical elements. An optical element set may include one or more interchangeable optical elements installed on the image capture device.

A shading map may refer to a map that is used to correct (e.g., reduce, remove) vignetting within an image caused by the optical element set. Vignetting may refer to distortion of an image towards the periphery of the image compared to the center of the image. Vignetting within an image may be symmetrical or asymmetrical. For example, vignetting may include reduction of an image's brightness, saturation, color, and/or other visual characteristics towards the towards the periphery of the image compared to the center of the image. For instance, the optical characteristic(s) of the optical element set may cause the brightness, saturation, and/or color of the image to fade as a function of distance from the center of the image. The shading map may compensate for the characteristic(s) of the optical element set to reduce and/or remove vignetting within the image. The shading map may be determined based on analysis of the image. For example, the shading map may be determined based on distribution of spatial gradients within the image. Statistics of the image (e.g., captured image, thumbnail image, one or more portions of the image) may be analyzed to determine shading map to be used for the image. Other determinations of shading maps are contemplated.

In some implementations, the shading map information component 102 may obtain shading map information characterizing a shading map while the corresponding image is being captured. In some implementations, the shading map information component 102 may obtain shading map information characterizing a shading map after the corresponding image has been captured and stored in memory (e.g., buffer, the electronic storage 13). In some implementations, the shading map information component 102 may obtain shading map information based on capture of an image by an image capture device. In some implementations, the shading map information component 102 may obtain shading map information based on user interaction with a user interface/application (e.g., image/video capture application), and/or other information. For example, a user interface/application may provide option(s) for a user to select one or more images. The shading map information defining the shading map(s) for the image(s) may be obtained based on the user's selection of the image(s) through the user interface/application. Other selections of shading maps are contemplated.

The lighting condition information component 104 may be configured to obtain lighting condition information and/or other information. Obtaining lighting condition information may include one or more of accessing, acquiring, analyzing, determining, examining, identifying, loading, locating, opening, receiving, retrieving, reviewing, selecting, storing, and/or otherwise obtaining the lighting condition information. The lighting condition information component 104 may obtain lighting condition information from one or more locations. For example, the lighting condition information component 104 may obtain lighting condition information from a storage location, such as the electronic storage 13, electronic storage of information and/or signals generated by one or more sensors, electronic storage of a device accessible via a network, and/or other locations. The lighting condition information component 104 may obtain lighting condition information from one or more hardware components (e.g., a hardware component of an image capture device) and/or one or more software components (e.g., software running on a computing device/image capture device).

The lighting condition information may characterize one or more lighting conditions during the capture of the image(s) by the image capture device through the optical element set. The lighting condition information may characterize a lighting condition by including information that describes, identifies, is associated with, and/or otherwise characterizes one or more of quantity, quality, attribute, feature, and/or other aspects of the lighting condition. For example, the lighting condition information may characterize a lighting condition by including information that defines the lighting condition and/or information that is used to identify the lighting condition. Other types of lighting condition information are contemplated.

A lighting condition may refer to state of lighting that is present and/or that affect capture of the image(s) by the image capture device through the optical element set. In some implementations, a lighting condition may include hue of light emitted by one or more lighting sources. For example, the lighting condition information may characterize the hue of light emitting by lighting source(s) that are present and/or that affect capture of image(s) by the image capture device. In some implementations, a lighting condition may include type of one or more lighting sources. For example, the lighting condition information may characterize the type(s) of lighting source(s) that are present and/or that affect capture of image(s) by the image capture device. The lighting condition may be determined based on analysis of the image capture device environment and/or analysis of the images. For example, the lighting condition may be determined by one or more automatic white balance algorithms/techniques running on the image capture device. Statistics of the image (e.g., captured image, thumbnail image, one or more portions of the image) may be analyzed to determine the lighting condition under which the image was captured. Other determinations of lighting conditions are contemplated.

The characteristic component 106 may be configured to determine one or more characteristics of the optical element set based on the shading map(s), the lighting condition(s), and/or other information. Determining the characteristic(s) of the optical element set may enable and/or accomplish dynamic optical element detection. For example, the optical element(s) included in the optical element set and/or characteristic(s) of the optical element(s) included in the optical element set may be dynamically determined during operation of the image capture device as and/or based on the characteristic(s) of the optical element set.

A characteristic of the optical element set may refer to material, configuration, quality, attribute, feature, type, and/or other aspects of the optical element set. A characteristic of the optical element set may refer to material, configuration, quality, attribute, feature, type, and/or other aspects of the optical element set that affects how the optical element set acts upon light passing through the optical element set. A characteristic of the optical element set may refer to material, configuration, quality, attribute, feature, type and/or other aspects of the optical element set that affects direction, deviation, and/or path of the light passing through the optical element set.

In some implementations, determination of the characteristic(s) of the optical element set may include identification of the optical element extension(s) installed on the image capture device. For example, one or more optical element extensions (e.g., lens extension) may have been installed on the image capture device to change, modify, and/or augment the optical element (lens) of the image capture device. The optical element set of the image capture device may include the optical element of the image capture device and the installed optical element extension(s). The characteristic component 106 may identify the optical extension(s) installed on the image capture device based on the shading map(s) corresponding to image(s) captured through the optical element set, the lighting condition(s) during the capture of the image(s) through the optical element set, and/or other information.

In some implementations, determination of the characteristic(s) of the optical element set may include identification of the interchangeable optical element(s) installed on the image capture device. For example, one or more interchangeable optical elements (e.g., swappable lens) may have been installed on the image capture device to set, change, and modify the optical characteristics of the image capture device. The optical element set of the image capture device may include the interchangeable optical element(s) installed on the image capture device. The characteristic component 106 may identify the interchangeable optical element(s) installed on the image capture device based on the shading map(s) corresponding to image(s) captured through the optical element set, the lighting condition(s) during the capture of the image(s) through the optical element set, and/or other information.

The characteristic component 106 may be configured to determine one or more characteristics of the optical element set based on one or more relationships between the optical element, the shading map, and the lighting condition. For example, a shading map may be a function of the lighting condition (e.g., illuminant) and the optical element (e.g., lens calibration). If the lighting condition and the shading map is known, then the optical element may be determined. FIG. 4 illustrates example lighting conditions and shading maps for an optical element. Different lighting conditions for the optical element may result in different shading maps for images captured through the optical element. For example, as shown in FIG. 4, eight different shading maps may correspond to images captured through the optical element under eight different lighting conditions (e.g., shading map A for an image captured through the optical element under lighting condition A). Thus, correspondence may exist between the lighting condition and the shading map for an optical element, and the characteristic(s) of the optical element determined based on the lighting condition and the shading map.

In some implementations, determination of the characteristic(s) of the optical element set based on the shading map(s) and the lighting condition(s) may include identification of the characteristic(s) of the optical element set based on classification using the shading map(s), the lighting condition(s), and/or other information. The shading map(s) and the lighting condition(s) may be used as input to one or more classifiers, and the classifier(s) may output the characteristic(s) of the optical element set and/or information to determine the characteristic(s) of the optical element set. In some implementations, one or more nearest neighbor classifications may be used. Usage of other classifications are contemplated.

In some implementations, determination of the characteristic(s) of the optical element set based on the shading map(s) and the lighting condition(s) may include identification of the characteristic(s) of the optical element set based on regression using the shading map(s), the lighting condition(s), and/or other information. The shading map(s) and the lighting condition(s) may be used as input to one or more regression tools, and the regression tool(s) may output the characteristic(s) of the optical element set and/or information to determine the characteristic(s) of the optical element set. Regression of the characteristic(s) of the optical element set may be facilitated through modeling of parameters to describe/define lighting condition(s) and/or optical element set characteristic(s).

FIG. 5 illustrates example optical element detection based on lighting condition and shading map. As shown in FIG. 5, different combinations of lighting condition and shading map may result in different identification of optical element/different determination of optical element characteristic(s). For instance, the characteristic component 106 may identify the characteristic(s) of the optical element set to be the characteristic(s) of an optical element B based on the lighting condition A and shading map B.

In some implementations, determination of the characteristic(s) of the optical element set may include determination of one or more calibration parameters for the optical element set. Calibration parameters may refer to extrinsic parameters, intrinsic parameters, and/or image capture device matrix based on the extrinsic parameters (representing rigid transformation from 3D world coordinate system to 3D image capture device's coordinate system, such as rotation and translation) and intrinsic parameters (representing projective transformation from 3D image capture device's coordinates into 2D image coordinates, such as focal length, optical element, skew coefficient). Calibration parameters may include geometric calibration, which may estimate the parameters of the optical element(s) and the image sensor(s) of the image capture device. Calibration parameters may include distortion coefficients. Calibration parameters may be defined using one or more polynomials and/or one or more coefficients of polynomial(s).

The operation component 108 may be configured to effectuate operation of the image capture device based on the characteristic(s) of the optical element set and/or other information. Operation of the image capture device may refer to one or more ways in which the image capture device operates. Operation of the image capture device may refer to one or more methods and/or one or more manners of functioning of the image capture device. Effectuating operation of the image capture device based on the characteristic(s) of the optical element set may include causing the image capture device to operate in particular way(s) based on the characteristic(s) of the optical element set. Effectuating operation of the image capture device based on the characteristic(s) of the optical element set may include causing the image capture device to function in particular manner(s) and/or using particular method(s) based on the characteristic(s) of the optical element set. For example, the image capture device may be operated in accordance with the characteristic(s) of the optical element set.

In some implementations, the operation of the image capture device may be changed based on the characteristic(s) of the optical element set and/or other information. The characteristic(s) of the optical element set determined by the characteristic component 106 may be compared with the characteristic(s) of the optical element set being used by the image capture device (operating characteristic(s)). Responsive to difference between the determined characteristic(s) with the operating characteristic(s), the operating characteristic(s) may be changed to be same as the determined characteristic(s). For example, the image capture device may be operating using characteristic(s) of a lens of the image capture device. The characteristics of the optical element set may be different from the characteristic of the lens due to installation of a lens extension. The operating characteristic(s) of the image capture device may be changed in accordance with the determined characteristic(s) of the optical element set (e.g., lens and lens extension). Thus, the image capture device operation may be changed automatically based on detection of change in characteristic(s) of the optical element set.

In some implementations, effectuating operation of the image capture device based on the characteristic(s) of the optical element set may include a change in operating calibration parameters of the image capture device for the optical element set based on the determined calibration parameter(s) for the optical element set. That is, the calibration parameter(s) of the image capture device may be changed to be same as/in accordance with the calibration parameter(s) for the optical element set determined by the characteristic component 106. For example, the calibration parameter(s) determined by the characteristic component 106 may be compared with the calibration parameter(s) being used by the image capture device (operating calibration parameter(s)). Responsive to difference between the determined calibration parameter(s) with the operating calibration parameter(s), the operating calibration parameter(s) may be changed to be same as the determined calibration parameter(s).

The determined calibration parameters may be used to calibrate one or more features of the image capture device, such as electronic image stabilization, image leveling, stitching, and/or image analysis. For example, the determined calibration parameters may be used in operating the image capture device to perform image stabilization, leveling, stitching, and/or correction (e.g., chromatic aberration correction, vignetting correction). Other calibration parameters and other usage of the calibration parameters are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
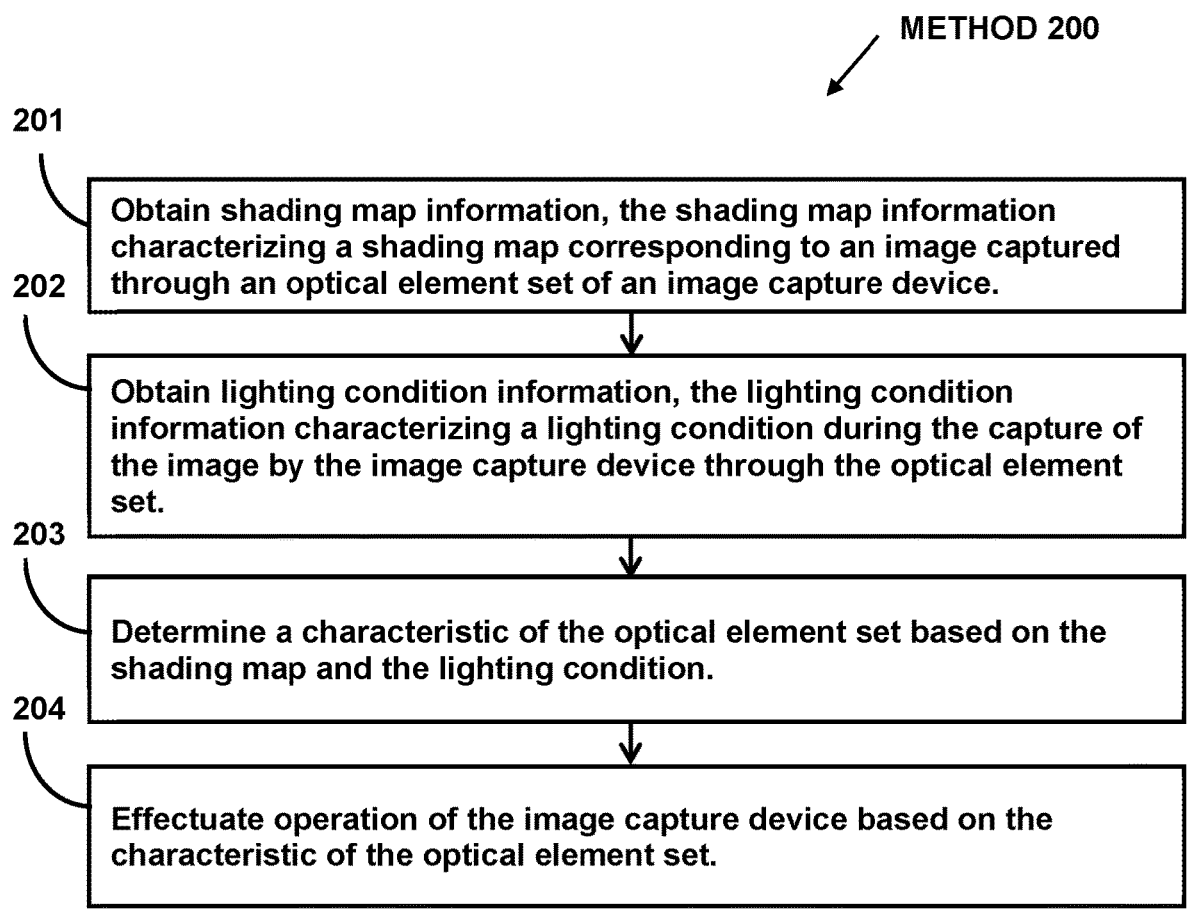
FIG. 2 illustrates an example method for dynamic optical element detection.

FIG. 2 illustrates method 200 for dynamic optical element detection. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, shading map information may be obtained. The shading map information may characterize a shading map corresponding to an image captured through an optical element set of an image capture device. In some implementation, operation 201 may be performed by a processor component the same as or similar to the shading map information component 102 (Shown in FIG. 1 and described herein).

At operation 202, lighting condition information may be obtained. The lighting condition information may characterize a lighting condition during the capture of the image by the image capture device through the optical element set. In some implementation, operation 202 may be performed by a processor component the same as or similar to the lighting condition information component 104 (Shown in FIG. 1 and described herein).

At operation 203, one or more characteristics of the optical element set may be determined based on the shading map, the lighting condition, and/or other information. In some implementation, operation 203 may be performed by a processor component the same as or similar to the characteristic component 106 (Shown in FIG. 1 and described herein).

At operation 204, operation of the image capture device may be effectuated based on the characteristic(s) of the optical element set and/or other information. In some implementation, operation 204 may be performed by a processor component the same as or similar to the operation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamic optical element detection, the system comprising:
   one or more physical processors configured by machine-readable instructions to:
      obtain shading map information, the shading map information characterizing a shading map corresponding to an image captured through an optical element set of an image capture device;
      obtain lighting condition information, the lighting condition information characterizing a lighting condition during the capture of the image by the image capture device through the optical element set;
      determine a characteristic of the optical element set based on the shading map and the lighting condition; and
      effectuate operation of the image capture device based on the characteristic of the optical element set.

2. The system of claim 1, wherein the shading map corrects vignetting within the image caused by the optical element set.

3. The system of claim 1, wherein the lighting condition includes hue of light emitted by one or more lighting sources.

4. The system of claim 1, wherein the lighting condition includes type of one or more lighting sources.

5. The system of claim 1, wherein the optical element set includes an optical element of the image capture device and an optical element extension installed on the image capture device.

6. The system of claim 5, wherein determination of the characteristic of the optical element set includes identification of the optical element extension installed on the image capture device.

7. The system of claim 1, wherein the optical element set includes an interchangeable optical element installed on the image capture device.

8. The system of claim 1, wherein determination of the characteristic of the optical element set includes determination of one or more calibration parameters for the optical element set.

9. The system of claim 8, wherein effectuation of the operation of the image capture device based on the characteristic of the optical element set includes a change in operating calibration parameters of the image capture device for the optical element set based on the one or more determined calibration parameters for the optical element set.

10. The system of claim 1, wherein determination of the characteristic of the optical element set based on the shading map and the lighting condition includes identification of the characteristic of the optical element set based on classification using the shading map and the lighting condition.

11. A method for dynamic optical element detection, the method performed by a computing system including one or more processors, the method comprising:
- obtaining, by the computing system, shading map information, the shading map information characterizing a shading map corresponding to an image captured through an optical element set of an image capture device;
- obtaining, by the computing system, lighting condition information, the lighting condition information characterizing a lighting condition during the capture of the image by the image capture device through the optical element set;
- determining, by the computing system, a characteristic of the optical element set based on the shading map and the lighting condition; and
- effectuating, by the computing system, operation of the image capture device based on the characteristic of the optical element set.

12. The method of claim 11, wherein the shading map corrects vignetting within the image caused by the optical element set.

13. The method of claim 11, wherein the lighting condition includes hue of light emitted by one or more lighting sources.

14. The method of claim 11, wherein the lighting condition includes type of one or more lighting sources.

15. The method of claim 11, wherein the optical element set includes an optical element of the image capture device and an optical element extension installed on the image capture device.

16. The method of claim 15, wherein determining the characteristic of the optical element set includes identifying the optical element extension installed on the image capture device.

17. The method of claim 11, wherein the optical element set includes an interchangeable optical element installed on the image capture device.

18. The method of claim 11, wherein determining the characteristic of the optical element set includes determining one or more calibration parameters for the optical element set.

19. The method of claim 18, wherein effectuating the operation of the image capture device based on the characteristic of the optical element set includes changing operating calibration parameters of the image capture device for the optical element set based on the one or more determined calibration parameters for the optical element set.

20. The method of claim 11, wherein determining the characteristic of the optical element set based on the shading map and the lighting condition includes identifying the characteristic of the optical element set based on classification using the shading map and the lighting condition.

* * * * *